Figure 1:
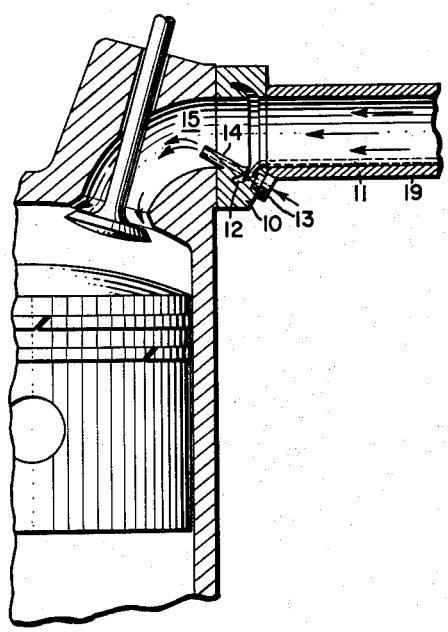

June 1, 1965 C. GALIC 3,186,390
METHOD OF REDUCING THE CARBON MONOXIDE CONTENT
IN EXHAUST GASES OF OTTO CARBURETOR ENGINES
Filed June 1, 1962

INVENTOR
CVJETKO GALIC

BY Burgess, Dinklage + Sprung

ATTORNEYS

United States Patent Office 3,186,390
Patented June 1, 1965

3,186,390
METHOD OF REDUCING THE CARBON MONOXIDE CONTENT IN EXHAUST GASES OF OTTO CARBURETOR ENGINES
Cvjetko Galic, An der Hauptwache 7–8,
Frankfurt am Main, Germany
Filed June 1, 1962, Ser. No. 199,260
Claims priority, application Germany, June 2, 1961,
G 32,387
3 Claims. (Cl. 123—119)

This invention relates to a method of reducing the carbon monoxide content in exhaust gases of Otto carburetor engines.

As is known, part of the fuel-air mixture taken in by carburetor engines is condensed in the manifold where it combines into a rill so that fuel in liquid state enters the combustion cylinder. In this manner, part of the fuel is not converted into power but instead partially precipitates at the cylinder wall, dilutes the lubricating oil and produces soot, carbon deposits and carbon monoxide gases by incomplete combustion, the formation of carbon monoxide being a major disadvantage which is eliminated by the invention. In the method of the invention, the condensate formed in the manifold or any fuel present as a liquid for other reasons is separated from the fuel-air mixture immediately before entering the cylinder so that only an ignitable and well combustible mixture of vaporized or atomized fuel and air passes into the cylinder in any case.

It is known to provide additional devices in the manifold between the carburetor and the inlet port of internal combustion engines for post-atomization of the fuel condensate travelling along the inside wall of the manifold and combining into a rill, these devices effecting atomization of the condensate by means of additional air, the rate of which is controlled in dependence upon the position of the throttle. However, these devices have been unsuccessful in practice up to the present.

The method of the invention likewise permits re-atomization of fuel precipitating in liquid form by means of additional air at the point of withdrawal. However, unlike the method performable with the prior art device, the method of the invention provides for addition of supplementary air into the manifold at a point which is as close to the intake port of the cylinder of the internal combustion engine as is possible rather than immediately downstream of the carburetor. As was shown by tests with transparent manifolds, it is only in this last part of the manifold where the rill is fully developed so that post-atomization of the rill is not opportune until it has reached this point. Moreover, a re-condensation of the post-atomized fuel is then hardly possible due to the short distance to the combustion chamber aided by the temperature of the valve chamber which becomes perceptible.

The fuel precipitating in liquid form in the manifold may be withdrawn in various manners immediately before the cylinder intake port. A short pipe section of smaller diameter may be provided in the interior of the manifold at its end attached to the cylinder and may be connected with the inside wall at the side facing the valve chamber so that the annular space formed between the inner pipe and the manifold, like a trap, receives the condensate flowing along the inner wall. In another embodiment of the invention, a narrow slot in which the condensate accumulates may be provided along the inner periphery of the manifold. The same effect can be achieved by means of an appropriately arranged ridge. A rib or groove or step extending completely or partially about the inner periphery may be used in place of the ridge. Since the liquid condensate predominantly accumulates in the lower half of the periphery of the manifold, it is sufficient if these devices for separating the liquid condensate from the fuel-air mixture by the method of the invention are provided only in this lower half. It is desirable particularly in those cases where the liquid fuel is intended to be re-atomized at the slot or ridge in the moment of its condensation that this slot or ridge extends only over one third of the periphery of the manifold to restrict the supply of additional air to that part of the inner periphery of the manifold over which fuel is flowing because the additional air would cause no or no substantial atomization of condensate at the non-wetted periphery of the manifold and only make the fuel-air mixture unnecessarily lean. It is desirable for directing the liquid condensate to the point of withdrawal or into the atomizing slot to provide condensate-accumulating ribs at the inside wall of the manifold.

As a further possibility of separating the fuel condensed and accumulated at the walls, the end of the manifold immediately upstream of the valve chamber may be constructed as a cyclone separator chamber, the efficiency of which, as required, may be adjusted such that only the liquid flowing along the inside wall of the manifold or, if desired, this liquid and large drops are separated.

Separation of the liquid condensate from the mixture may also be effected by a combination of the measures described above, e.g. by providing a ridge extending transversely to the direction of flow at that part of the inside wall of the manifold which is not occupied by the slot. The liquid is then either directed into the slot by this ridge or the condensate portions impinge upon this ridge where they are picked up and atomized either by the fuel-air mixture or still by the supplied fresh air. If the accumulated fuel is not immediately re-atomized at the point where it is separated from the mixture and just before the mixture enters the cylinder, it may also be sucked off by vacuum or by means of a pump and returned into the carburetor or into the fuel supply line.

Figure 2:
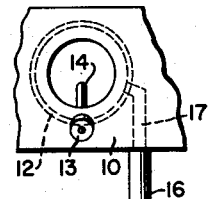
Figure 3:
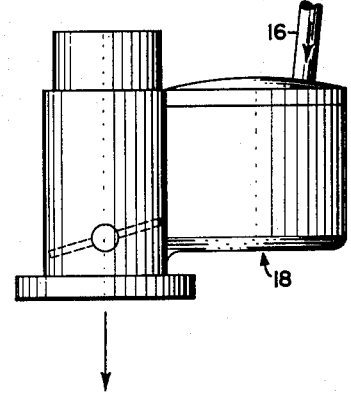
Figure 3:
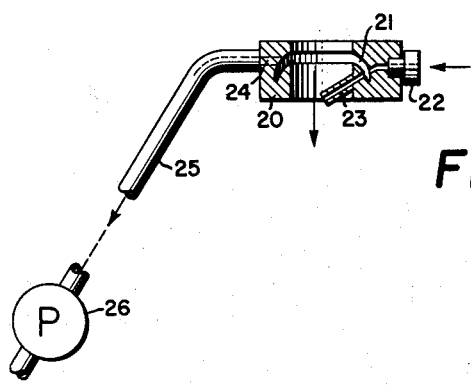

In the drawing, FIG. 1 is a schematic sectional view of an engine, illustrating the operation of the present invention in the flow line between the manifold and the inlet port of the engine, FIG. 2 is a schematic view of the embodiment of FIG. 1 showing the means by which collected condensed liquid fuel may be recovered for recycling to a carburetor, and FIG. 3 is a further embodiment similar to that of FIGS. 1 and 2, in which the means of the invention are situated for vertical flow of the fuel-air mixture rather than for horizontal flow as in the case of the embodiment of FIGS. 1 and 2, FIG. 3 illustrating how collected condensed fuel may be returned to the fuel pump.

In FIG. 1, the engine includes a usual piston within the cylinder and the usual valve for closing the inlet port 15 from communication with the manifold 19. In accordance with the invention, an extension piece 10 is interposed between the end of the manifold 19 and the inlet port 15 of the engine to provide for the operation of the invention as close to the inlet port of the engine combustion chamber as possible, such point being beyond the point at which recondensation of any post-atomized fuel is possible. Thus an annular groove 12 is provided in the internal wall of piece 10 and this communicates with an air line 13 which may be placed in communication with the atmosphere or with an air reservoir as desired. The fuel which condenses out of the fuel-air mixture during passage from the carburetor to the engine through the manifold passes in the form of a rill 11 whereupon the same is collected in the groove 12 and acted upon by the air to atomize the fuel once more such that the atomized fuel will issue from the nozzle 14 immediately at the inlet port 15. As may be seen in FIG. 2, looking toward the inlet port from the manifold side of the piece 10, the excess of the liquid fuel in the groove 12 is drawn off by means of a conduit 17 which is flow connected by pipe 16 to a carburetor assembly 18 for reuse. The conduit 17 is positioned so that all condensed liquid fuel which exceeds the operating level of the nozzle 14 will be removed whereby undesired overflow from the groove 12 will be avoided and in turn the passage of condensed liquid fuel to the engine. It will be appreciated that in accordance with the construction shown, the carbon monoxide content of the exhaust gases of engines such as Otto carburetor piston engines will be reduced since the liquid fuel which has condensed from the fuel-air mixture in the intake manifold is effectively separated at a point in the manifold immediately before the inlet port of the combustion chamber, such separated fuel being instantly re-atomized and re-vaporized at piece 10 by the introduction of additional air through air line 13 to cause re-atomization or post-atomization at this point. Indeed, such point is beyond that point at which recondensation is possible.

FIG. 3 illustrates the embodiment where the fuel-air mixture from the carburetor is passed downwardly to the inlet port of an engine. The piece 20 containing the groove 21, the air line 22, and the nozzle 23, is similar to piece 10 of FIGS. 1 and 2, except for the positioning thereof horizontally rather than vertically and except for the use of a flow conduit 24 for collecting the excess condensed fuel from groove 21 and conducting the same via pipe 25 back to the fuel pump shown schematically at 26. In this case as well, the position of the flow conduit 24 is such that only excess collected liquid fuel will be returned to the fuel pump or to any other part of the fuel supply line as the artisan will appreciate.

The method of the invention is generally applicable to engines which operate by the Otto principle, i.e., to engines where a finished and ignitable fuel-air mixture produced by vaporization of readily volatile fuels is introduced into the cylinder, compressed and burned by applied ignition.

The application of the invention is not restricted to conventional three- or multi-cylinder engines having reciprocating pistons but also usable for various constructions of rotary piston engines and disc piston engines since it is equally essential for the reduction of the carbon monoxide content in the exhaust gases of these engine types that the fuel is uniformly and finely distributed in the air to avoid the disadvantages of incomplete combustion caused by liquid fuel.

Due to the fact that the condensate formed in the manifold is withdrawn or re-atomized in accordance with the invention immediately upstream of the valve chamber, combustion of the fuel-air mixture is considerably improved and engine output increased with a simultaneous reduction of consumption. Tests made with different engine types have shown that the carbon monoxide content in the exhaust gases at reduced load where it is normally particularly high is reduced by about 80% by means of the method of the invention. When idling, the reduction of the carbon monoxide content reaches 95% as compared with idling adjustment recommended for the engines by the factory. The considerable reduction of the carbon monoxide content in all speed ranges is not at the expense of a disadvantageous reduction of the fuel content in the fuel-air mixture, i.e., of an excessively lean mixture which could result in superheating of the engine, but is rather achieved by an improvement of the combustion process, which improvement simultaneously results in a reduction of fuel consumption and an increase in power output.

Extensive tests have further shown that the acceleration periods of vehicles were always shorter and the maximum speeds obtained were always higher with engines fed in accordance with the invention. Due to improved combustion, engines equipped with a device for carrying out the method of the invention have lower oil contamination and piston wear while service life of the engines is considerably increased.

What is claimed is:

1. Method of reducing the carbon monoxide content in exhaust gases of Otto carburetor piston engines in which an atomized and vaporized fuel-air mixture is passed from the carburetor to the engine intake manifold and thence through said intake manifold to the inlet port of a corresponding combustion chamber for combustion in such chamber, which comprises separating the fuel appearing in liquid and condensed state from the fuel-air mixture in the intake manifold at a point in said manifold immediately before the inlet port of said combustion chamber, and instantly reatomizing and revaporizing said separated fuel thereat by introducing additional air into said manifold at said point through only the portion of the periphery thereof where said separated fuel is situated for exerting an instant atomizing and vaporizing effect on said separated fuel, said point being beyond the point at which recondensation is possible.

2. Method according to claim 1 wherein any excess separated fuel over that being instantly reatomized and revaporized is drawn off from said intake manifold and returned to the carburetor.

3. Method according to claim 1 wherein any excess separated fuel over that being instantly reatomized and revaporized is drawn off from said intake manifold and returned to the fuel supply line.

References Cited by the Examiner

UNITED STATES PATENTS

| | | | |
|---|---|---|---|
| 1,442,257 | 1/23 | Dorris. | |
| 1,501,323 | 7/24 | Edwards | 123—141 |
| 1,530,157 | 3/25 | Edwards | 123—141 |
| 1,624,249 | 4/27 | Hutchinson | 123—119 X |
| 1,763,746 | 6/30 | Benkiser | 123—119 |
| 2,057,165 | 10/36 | Schreurs | 123—141 |
| 2,083,752 | 6/37 | Trussell | 123—119 X |
| 2,098,391 | 11/37 | Irvin | 123—119 X |
| 2,215,697 | 9/40 | Hansen | 123—119 |
| 2,682,259 | 6/54 | Watkins | 123—73 |
| 2,717,584 | 9/55 | Upton | 123—73 X |
| 3,057,335 | 10/62 | Osborne | 123—119 |

FOREIGN PATENTS 339,436   7/21   Germany.

RICHARD B. WILKINSON, *Primary Examiner.*

KARL J. ALBRECHT, FRED E. ENGELTHALER,
*Examiners.*